United States Patent
Capelot et al.

(10) Patent No.: US 10,633,490 B2
(45) Date of Patent: **\*Apr. 28, 2020**

(54) SEMI-CRYSTALLINE POLYAMIDE COMPOSITION WITH HIGH GLASS TRANSITION TEMPERATURE FOR THERMOPLASTIC MATERIAL, PROCESS FOR MANUFACTURING SAME AND USES THEREOF

(71) Applicant: ARKEMA FRANCE, Colombes (FR)

(72) Inventors: Mathieu Capelot, Bernay (FR); Gilles Hochstetter, L'Hay les Roses (FR)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/758,968

(22) PCT Filed: Jul. 10, 2017

(86) PCT No.: PCT/FR2017/051872
§ 371 (c)(1),
(2) Date: Mar. 9, 2018

(87) PCT Pub. No.: WO2018/011494
PCT Pub. Date: Jan. 18, 2018

(65) Prior Publication Data
US 2019/0040198 A1    Feb. 7, 2019

(30) Foreign Application Priority Data

Jul. 11, 2016 (FR) ...................................... 16 56624

(51) Int. Cl.
| C08G 69/26 | (2006.01) |
| C08K 7/02 | (2006.01) |
| C08L 77/06 | (2006.01) |
| C08G 69/36 | (2006.01) |

(52) U.S. Cl.
CPC ........... *C08G 69/265* (2013.01); *C08G 69/36* (2013.01); *C08K 7/02* (2013.01); *C08L 77/06* (2013.01)

(58) Field of Classification Search
None
See application file for complete search history.

(56) References Cited

U.S. PATENT DOCUMENTS

| 2,705,227 | A | 3/1955 | Stamatoff | |
| 3,875,120 | A * | 4/1975 | Brinkmann | C08G 69/265 528/339 |
| 5,422,418 | A | 6/1995 | Maj et al. | |
| 5,665,855 | A | 9/1997 | Acevedo et al. | |
| 7,927,710 | B2 | 4/2011 | Hewel | |
| 8,324,307 | B2 | 12/2012 | Harder et al. | |
| 8,771,862 | B2 | 7/2014 | Kim et al. | |
| 9,752,029 | B2 | 9/2017 | Briffaud et al. | |
| 2009/0062452 | A1 * | 3/2009 | Harder | C08G 69/26 524/494 |
| 2011/0306718 | A1 | 12/2011 | Scherzer et al. | |
| 2015/0322622 | A1 | 11/2015 | Gaillard et al. | |

FOREIGN PATENT DOCUMENTS

| CN | 104211953 A | 12/2014 |
| EP | 0550314 A1 | 7/1993 |
| EP | 0581641 A1 | 2/1994 |
| EP | 0581642 A1 | 2/1994 |
| EP | 0739924 A1 | 10/1996 |
| EP | 1988113 A1 | 11/2008 |
| EP | 2028231 A1 | 2/2009 |
| EP | 2 727 951 A1 | 7/2014 |
| WO | 2010130930 A1 | 11/2010 |
| WO | 2011003973 A2 | 1/2011 |
| WO | 2014064375 A1 | 5/2014 |
| WO | 2016102217 A1 | 6/2016 |
| WO | 2017098178 A1 | 6/2017 |
| WO | 2017098179 A1 | 6/2017 |

OTHER PUBLICATIONS

International Search Report and Written Opinion for International Application No. PCT/FR2017/051872, dated Oct. 2, 2017, 9 pages.
Postma et al., "A Simple Method for Determining Protic End-groups of Synthetic Polymers by 1H NMR Spectroscopy", Polymer, vol. 47, 2006, pp. 1899-1911.

* cited by examiner

*Primary Examiner* — Robert T Butcher
(74) *Attorney, Agent, or Firm* — Thomas F. Roland

(57) ABSTRACT

The invention relates to a composition for thermoplastic material comprising:
0 to 70% by weight, preferentially 20% to 60% by weight, of short reinforcing fibers,
30% to 100% by weight, preferentially 40% to 80% by weight, of a thermoplastic matrix based on at least one semi-crystalline polyamide polymer,
0 to 50% of additives and/or other polymers,
said semi-crystalline polyamide polymer being:
a) a reactive composition comprising or consisting of at least one reactive polyamide prepolymer which is a precursor of said semi-crystalline polyamide polymer, or, as an alternative to a),
b) a nonreactive composition of at least one polyamide polymer, said composition being that of said thermoplastic matrix defined above,
and said reactive polyamide prepolymer of the composition a) and said polyamide polymer of the composition b) comprising or consisting of at least one BACT/XT copolyamide.

42 Claims, 1 Drawing Sheet

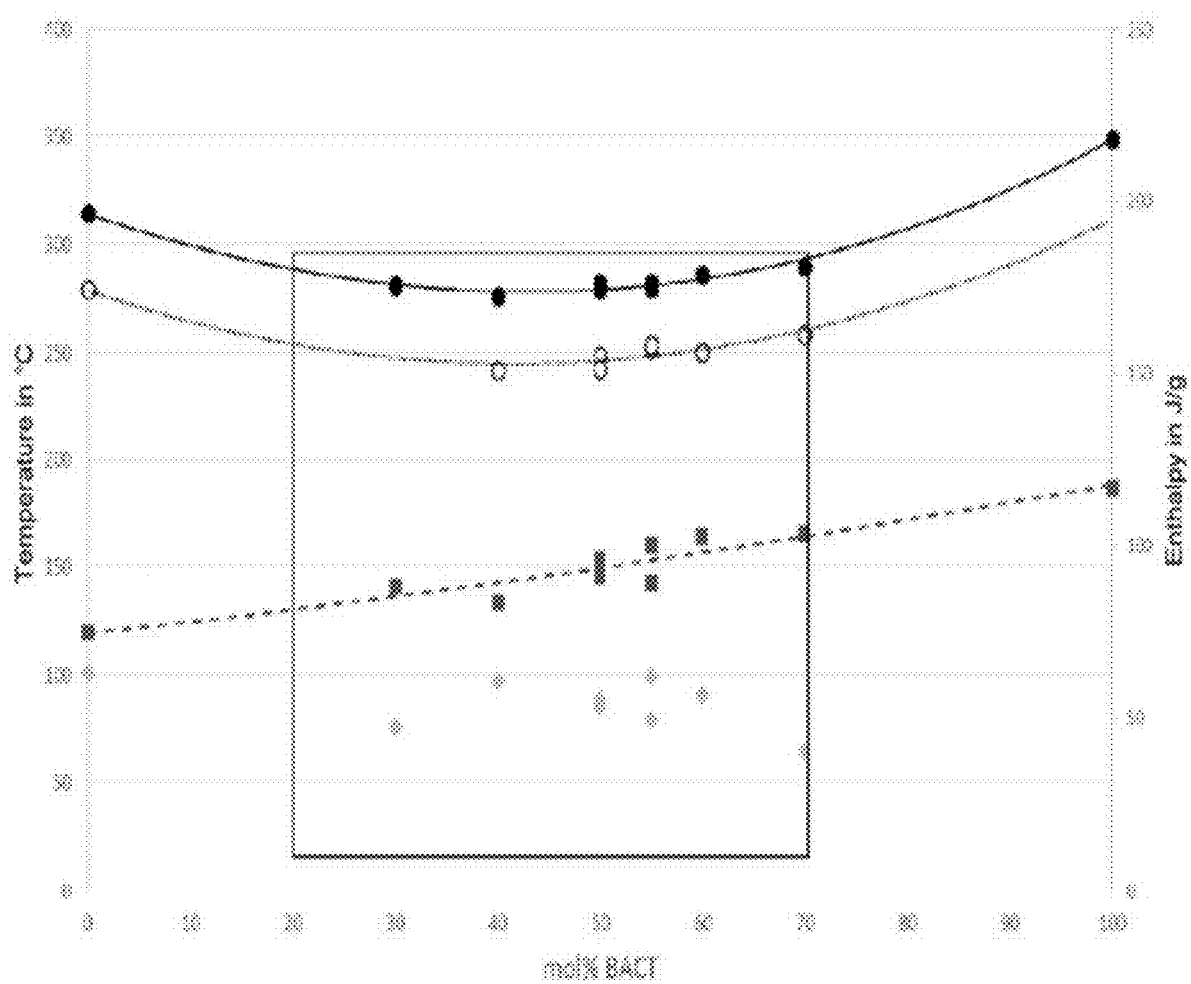

SEMI-CRYSTALLINE POLYAMIDE COMPOSITION WITH HIGH GLASS TRANSITION TEMPERATURE FOR THERMOPLASTIC MATERIAL, PROCESS FOR MANUFACTURING SAME AND USES THEREOF

CROSS-REFERENCE TO RELATED APPLICATIONS

This is the national phase of International Application No, PCT/FR2017/051872, filed 10 Jul. 2017, which claims priority to French Application No. 16-56624, filed 11 Jul. 2016. The disclosure of each of these applications is incorporated herein by reference in its entirety for all purposes.

FIELD OF THE INVENTION

The invention relates to a novel semi-crystalline (sc) polyamide composition having a high glass transition temperature, based on bis(aminomethyl)cyclohexane (BAC) for thermoplastic material.

It also relates to a process for manufacturing said thermoplastic material and also the uses of said composition for manufacturing mechanical or structural parts based on said material for material parts and also the part which results therefrom and for applications in the motor vehicle, railway, marine, road transport, wind power, sport, aeronautical and aerospace, construction, panel and leisure fields.

BACKGROUND OF THE INVENTION

A major challenge in materials is to find a polyamide resin which meets the following specifications:
  High Tg for a wide range of operating temperatures;
  The lowest possible Mp, so as to be readily processable without recourse to excessively specific mold metallurgies;
  A very good crystallization capacity in order to be able to be rapidly demolded and thus to be compatible with intensive production cycles, such as those used in the motor vehicle industry;
  A high rigidity, including under hot conditions, so as to be able to obtain the highest possible moduli of the final material.

Document CN104211953 describes a polyamide composition comprising from 30% to 99.9% by weight of a polyamide resin comprising from 60 to 95 mol % of 10T, from 5 to 40 mol % of 5'T, 5' corresponding to 2-methyl-1,5-pentamethylenediamine, from 0% to 70% by weight of a reinforcing filler and from 0.1% to 50% by weight of an additive.

The polyamide resin has a melting point above 260° C.

EP 550 314 describes, among its examples, (nonreactive) copolyamide compositions in a search for melting points of greater than 250° C. and limited Tg values, with the majority of the examples cited having an excessively low Tg (<80° C.) or an excessively high Mp (>300° C.).

EP 1 988 113 describes a molding composition based on a 10T/6T copolyamide with:
  40 to 95 mol % of 10T
  5 to 40% of 6T.

Polyamides with a high melting point of greater than 270° C. are targeted in particular. The examples mentioned and FIG. 1 teach that the melting point of these compositions is at least approximately 280° C.

WO 2011/003973 describes compositions comprising from 50 mol % to 95 mol % of a unit based on a linear aliphatic diamine comprising from 9 to 12 carbon atoms and on terephthalic acid and from 5% to 50% of unit combining terephthalic acid with a mixture of 2,2,4- and 2,4,4-trimethylhexanediamine.

US 2011/306718 describes a process for the pultrusion of reactive aliphatic polyamides having low Tg values in combination with chain extenders of polymeric structure bearing several (and many more than 2) anhydride or epoxide functions. This document does not describe any nonpolymeric extender.

WO 2014/064375 describes in particular a PA MXDT/10T which exhibits an excellent compromise between the various characteristics described above. Unfortunately, the meta-xylene diamine (MXD) monomer used is highly subject to side-reactions, giving rise in particular to the formation of branching.

The drawbacks of the prior art, with the absence of a good compromise between the mechanical performance levels and the processing ability (ease of transformation) at lower temperature with a shorter production cycle time are overcome by means of the solution of the present invention which targets semi-crystalline PA compositions having an excellent compromise between high mechanical performance levels (mechanical strength), in particular under hot conditions, and easy processing. It in fact has a high rigidity and has a glass transition temperature >120° C., a Mp<290° C., and also an excellent crystallization capacity (Mp–Tc<40° C.), which makes it a matrix of choice for extrusion, injection-molding or molding processing, in particular for the wind power, motor vehicle or aeronautical industry.

More particularly, in the case of the reactive compositions, it is sought to have faster reaction kinetics while at the same time having a rate and/or temperature of crystallization of the polymer formed that are also higher.

The choice of a semi-crystalline polyamide polymer, as matrix of the thermoplastic material of the invention, has the advantage, compared with amorphous polyamides, of significantly improved mechanical performance levels, especially at elevated temperature, such as creep resistance or fatigue resistance. In addition, having a melting point above 200° C. has the advantage in the motor vehicle industry of being compatible with treatments by cataphoresis, which a structure of amorphous PA type does not permit. As for the amorphous materials, a Tg of greater than or equal to 90° C. is sought so as to ensure good mechanical properties for the thermoplastic material over the entire working temperature range, for example up to 90° C. for the wind power industry, up to 100° C. for the motor vehicle industry and up to 120° C. for the aeronautical industry. Conversely, an excessively high melting point, in particular of greater than 290° C., is on the other hand harmful as it requires processing the thermoplastic material at higher temperatures with constraints in terms of molding equipment to be used (and associated heating system) and excessive consumption of energy with, in addition, risks of thermal degradation due to heating at temperatures higher than the melting point of said polyamide, with as a consequence the modification of the properties of the final thermoplastic matrix and of the material which results therefrom. The crystallinity of said polymer must be as high as possible, but with a melting point Mp that is not too high (Mp<290° C. and more particularly <280° C.) in order to optimize the mechanical performance levels and the crystallization rate and/or the crystallization temperature must be as high as possible, in order to reduce the molding time before ejection of the molded part with a selective choice of the composition of said semi-crystalline polyamide.

SUMMARY OF THE INVENTION

The subject of the present invention is the processing of novel specific compositions of thermoplastic material, in particular based on semi-crystalline polyamide, having a good compromise between high mechanical performance levels (mechanical strength), in particular hot mechanical performance levels, and easy processing. This means that the objective is compositions that are easy to process with transformation and processing temperatures that are lower than those for other compositions of the prior art, with a more favorable overall processing energy balance, a shorter cycle time and a higher productivity. More particularly, the solution of the invention, in the case of reactive compositions, allows, using compositions based on semi-crystalline reactive polyamide prepolymers, both fast reaction kinetics and fast crystallization kinetics with a shorter cycle time. More particularly, the polyamide polymer matrix, while having a high Tg and a limited Mp, as defined, with easy processing of said thermoplastic material, must also have a high crystallization speed characterized first by a difference between melting point and crystallization temperature Mp−Tc not exceeding 40° C., preferably not exceeding 30° C. Consequently, the object of the invention is to develop a polyamide composition corresponding to the needs already defined above:

High Tg for a wide range of operating temperatures;
The lowest possible Mp, so as to be readily processable without recourse to excessively specific mold metallurgies;
A very good crystallization capacity in order to be able to be rapidly demolded and thus to be compatible with intensive production cycles, such as those used in the motor vehicle industry;
A high rigidity, including under hot conditions, so as to be able to obtain the highest possible moduli of the final material.

The present invention relates to a composition for thermoplastic material comprising:
0 to 70% by weight, preferentially 20% to 60% by weight, of short reinforcing fibers,
30% to 100% by weight, preferentially 40% to 80% by weight, of a thermoplastic matrix based on at least one semi-crystalline polyamide polymer,
0 to 50% of additives and/or other polymers,
said semi-crystalline polyamide polymer being:
a) a reactive composition comprising or consisting of at least one reactive polyamide prepolymer which is a precursor of said semi-crystalline polyamide polymer,
or, as an alternative to a),
b) a nonreactive composition of at least one polyamide polymer, said composition being that of said thermoplastic matrix defined above,
and said reactive polyamide prepolymer of the composition a) and said polyamide polymer of the composition b) comprising or consisting of at least one BACT/XT copolyamide in which:
BACT is a unit comprising an amide unit present at a molar content ranging from 20% to 70%, preferably from 25% to 60%, more preferentially from 35% to 55%, wherein BAC is chosen from 1,3-bis(aminomethyl)cyclohexyl (1,3-BAC), 1,4-bis(aminomethyl)cyclohexyl (1,4-BAC) and a mixture thereof, and T is terephthalic acid, XT is a unit comprising an amide unit present at a molar content ranging from 30% to 80%, preferably from 40% to 75%, more preferentially from 45% to 65%, wherein X is a C9 to C18, preferably C9, C10, C11 and C12, preferentially C10, C11 and C12, linear aliphatic diamine, and wherein T is terephthalic acid;

in the BACT and/or XT units, independently of one another, up to 30 mol %, preferably 20 mol %, in particular up to 10 mol %, relative to the total amount of dicarboxylic acids, of the terephthalic acid can be replaced with other aromatic, aliphatic or cycloaliphatic dicarboxylic acids comprising 6 to 36 carbon atoms, in particular 6 to 14 carbon atoms, and in the BACT and/or XT units, independently of one another, up to 30 mol %, preferably 20 mol %, in particular up to 10 mol %, of the BAC and/or where appropriate of X, relative to the total amount of diamines, can be replaced with other diamines comprising from 4 to 36 carbon atoms, in particular 6 to 12 carbon atoms, and in the copolyamide, no more than 30 mol %, preferably no more than 20 mol %, preferably no more than 10 mol %, relative to the total amount of monomers, can be formed by lactams or aminocarboxylic acids, and on condition that the sum of the monomers which replace the terephthalic acid, the BAC and X does not exceed a concentration of 30 mol %, preferably 20 mol %, preferably 10 mol %, relative to the total amount of monomers used in the copolyamide, and on condition that BACT and XT units are always present in said polyamide polymer.

Said semi-crystalline polyamide polymer is consequently the semi-crystalline polyamide polymer which forms the basis of the thermoplastic matrix, said thermoplastic matrix possibly being obtained from the reactive composition a) which corresponds to:

either a polyamide prepolymer with a di-$NH_2$ or di-$CO_2H$ end group which can react respectively with another polyamide prepolymer with a di-$CO_2H$ or di-$NH_2$ end group to give said semi-crystalline polyamide polymer, or a prepolymer with an $NH_2$ and $CO_2H$ end group which can react with itself, to give said semi-crystalline polyamide polymer, or a prepolymer which can react with a chain extender, to give said semi-crystalline polyamide polymer, or the semi-crystalline polyamide polymer is already present in the non-reactive composition b).

In other words, the present invention relates to a composition for thermoplastic material comprising:
0 to 70% by weight, preferentially 20% to 60% by weight, of short reinforcing fibers,
30% to 100% by weight, preferentially 40% to 80% by weight, of a thermoplastic matrix based on at least one semi-crystalline polyamide polymer,
0 to 50% of additives and/or other polymers,
said thermoplastic matrix being:
a) a reactive composition comprising or consisting of at least one reactive polyamide prepolymer which is a precursor of said semi-crystalline polyamide polymer,
or, as an alternative to a),
b) a nonreactive composition of at least one polyamide polymer, said composition being that of said thermoplastic matrix defined above, and said reactive polyamide prepolymer of the composition a) and said polyamide polymer of the composition b) comprising or consisting of at least one BACT/XT copolyamide in which:

BACT is a unit comprising an amide unit present at a molar content ranging from 20% to 70%, preferably from 25% to 60%, more preferentially from 35% to 55%, wherein BAC is chosen from 1,3-bis(aminomethyl)cyclohexyl (1,3-BAC) and 1,4-bis(aminomethyl)cyclohexyl (1,4-BAC) and a mixture thereof, and T is terephthalic acid, XT is a unit comprising an amide unit present at a molar content ranging from 30% to 80%, preferably from 40% to 75%, more preferentially from 45% to 65%, wherein X is a $C_9$ to $C_{18}$, preferably $C_9$, $C_{10}$, $C_{11}$ and $C_{12}$, preferentially $C_{10}$, $C_{11}$ and $C_{12}$, linear aliphatic diamine, and wherein T is terephthalic acid;

in the BACT and/or XT units, independently of one another, up to 30 mol %, preferably 20 mol %, in particular up to 10 mol %, relative to the total amount of dicarboxylic acids, of the terephthalic acid can be replaced with other aromatic, aliphatic or cycloaliphatic dicarboxylic acids comprising 6 to 36 carbon atoms, in particular 6 to 14 carbon atoms, and in the BACT and/or XT units, independently of one another, up to 30 mol %, preferably 20 mol %, in particular up to 10 mol %, of the BAC and/or where appropriate of X, relative to the total amount of diamines, can be replaced with other diamines comprising from 4 to 36 carbon atoms, in particular 6 to 12 carbon atoms, and in the copolyamide, no more than 30 mol %, preferably no more than 10 mol %, relative to the total amount of monomers, can be formed by lactams or aminocarboxylic acids, and on condition that the sum of the monomers which replace the terephthalic acid, the BAC and X does not exceed a concentration of 30 mol %, preferably 10 mol %, relative to the total amount of monomers used in the copolyamide, and on condition that BACT and XT units are always present in said polyamide polymer.

DETAILED DESCRIPTION OF THE INVENTION

The expression "said reactive polyamide prepolymer of the composition a) and said polyamide polymer of the composition b) comprising or consisting of at least one BACT/XT copolyamide" signifies that the reactive polyamide prepolymer of the composition a) or said polyamide polymer of the composition b) consist exclusively of units comprising BACT and XT amide units in respective proportions defined above, or the reactive polyamide prepolymer of the composition a) or said polyamide polymer of the composition b) comprise BACT and XT amide units in respective proportions defined above, but also other units comprising amide units.

Advantageously, the proportion of units comprising amide units the proportion of BACT/XT BACT and XT in the reactive polyamide prepolymer of the composition a) or said polyamide polymer of the composition b) is greater than 50%, in particular greater than 60%, in particular greater than 70%, preferentially greater than 80%, in particular greater than 90%.

The present invention therefore relates to a composition for thermoplastic material comprising:

0 to 70% by weight, preferentially 20% to 60% by weight, of short reinforcing fibers, 30% to 100% by weight, preferably 40% to 80% by weight, of a thermoplastic matrix based on at least one semi-crystalline polyamide polymer, 0 to 50% of additives and/or other polymers, said semi-crystalline polyamide polymer comprising or consisting of at least one BACT/XT copolyamide in which:

BACT is a unit comprising an amide unit present at a molar content ranging from 20% to 70%, preferably from 25% to 60%, more preferentially from 35% to 55%, wherein BAC is chosen from 1,3-bis(aminomethyl)cyclohexyl (1,3-BAC), 1,4-bis(aminomethyl)cyclohexyl (1,4-BAC) and a mixture thereof, and T is terephthalic acid, XT is a unit comprising an amide unit present at a molar content ranging from 30% to 80%, preferably from 40% to 75%, more preferentially from 45% to 65%, wherein X is a $C_9$ to $C_{18}$, preferably $C_9$, $C_{10}$, $C_{11}$ and $C_{12}$, preferentially $C_{10}$, $C_{11}$, and $C_{12}$, linear aliphatic diamine, and wherein T is terephthalic acid;

in the BACT and/or XT units, independently of one another, up to 30 mol %, preferably 20 mol %, in particular up to 10 mol %, relative to the total amount of dicarboxylic acids, of the terephthalic acid can be replaced with other aromatic, aliphatic or cycloaliphatic dicarboxylic acids comprising 6 to 36 carbon atoms, in particular 6 to 14 carbon atoms, and in the BACT and/or XT units, independently of one another, up to 30 mol %, preferably 20 mol %, in particular up to 10 mol %, of the BAC and/or where appropriate of X, relative to the total amount of diamines, can be replaced with other diamines comprising from 4 to 36 carbon atoms, in particular 6 to 12 carbon atoms, and in the copolyamide, no more than 30 mol %, preferably no more than 10 mol %, relative to the total amount of monomers, can be formed by lactams or aminocarboxylic acids, and on condition that the sum of the monomers which replace the terephthalic acid, the BAC and X does not exceed a concentration of 30 mol %, preferably 10 mol %, relative to the total amount of monomers used in the copolyamide, and on condition that BACT and XT units are always present in said polyamide polymer.

The composition according to the invention can comprise short reinforcing fibers (or short fibrous reinforcement).

Preferably, the "short" fibers are between 200 and 400 µm in length.

These short reinforcing fibers may be chosen from:

natural fibers;

mineral fibers, said fibers having high melting points Mp' above the melting point Mp of said semi-crystalline polyamide of the invention and above the polymerization and/or processing temperature;

polymeric fibers or polymer fibers having a melting point Mp', or if not Mp', a glass transition temperature Tg', above the polymerization temperature or above the melting point Mp of said semi-crystalline polyamide constituting said matrix of the thermoplastic material and above the processing temperature;

or mixtures of the abovementioned fibers.

As mineral fibers suitable for the invention, mention may be made of carbon fibers, which include fibers of nanotubes or carbon nanotubes (CNTs), carbon nanofibers or graphenes; silica fibers such as glass fibers, in particular of E, R or S2 type; boron fibers; ceramic fibers, in particular silicon carbide fibers, boron carbide fibers, boron carbonitride fibers, silicon nitride fibers, boron nitride fibers, basalt fibers; fibers or filaments based on metals and/or alloys thereof; fibers of metal oxides, in particular of alumina ($Al_2O_3$); metallized fibers such as metallized glass fibers and metallized carbon fibers, or mixtures of the abovementioned fibers.

More particularly, these fibers may be chosen as follows:
the mineral fibers may be chosen from: carbon fibers, carbon nanotube fibers, glass fibers, in particular of E, R or S2 type, boron fibers, ceramic fibers, in particular silicon carbide fibers, boron carbide fibers, boron carbonitride fibers, silicon nitride fibers, boron nitride fibers, basalt fibers, fibers or filaments based on metals and/or alloys thereof, fibers based on metal oxides such as $Al_2O_3$, metallized fibers such as metallized glass fibers and metallized carbon fibers, or mixtures of the abovementioned fibers, and the polymer fibers or polymeric fibers, under the abovementioned condition, are chosen from:
thermosetting polymer fibers and more particularly those chosen from: unsaturated polyesters, epoxy resins, vinyl esters, phenolic resins, polyurethanes, cyanoacrylates and polyimides, such as bismaleimide resins, or aminoplasts resulting from the reaction of an amine such as melamine with an aldehyde such as glyoxal or formaldehyde, fibers of thermoplastic polymers, more particularly chosen from: polyethylene terephthalate (PET), polybutylene terephthalate (PBT), polyamides fibers, fibers of aramids (such as Kevlar®) and aromatic polyamides such as those corresponding to one of the formulae: PPD.T, MPD.I, PAA and PPA, with PPD and MPD being respectively p- and m-phenylenediamine, PAA being polyarylamides and PPA being polyphthalamides, fibers of polyamide block copolymers such as polyamide/polyether, fibers of polyaryl ether ketones (PAEKs) such as polyether ether ketone (PEEK), polyether ketone ketone (PEKK) or polyether ketone ether ketone ketone (PEKEKK).

The preferred short reinforcing fibers are short fibers (with a circular cross-section) chosen from: carbon fibers, including those which are metallized, glass fibers, including those which are metallized, of E, R, S2 type, fibers of aramids (such as Kevlar®) or aromatic polyamides, polyaryl ether ketone (PAEK) fibers, such as polyether ether ketone (PEEK) fibers, polyether ketone ketone (PEKK) fibers, polyether ketone ether ketone ketone (PEKEKK) fibers, or mixtures thereof.

More particularly, the natural fibers are chosen from linseed, castor, wood, sisal, kenaf, coconut, hemp and jute fibers.

Preferably, the reinforcing fibers present in the composition according to the invention are chosen from glass fibers, carbon fibers, from linseed fibers and mixtures thereof, and more preferentially linseed fibers and carbon fibers, and even more preferentially carbon fibers.

With regard to the additives, without being limited thereto, the composition according to one preferred variant of the invention more particularly comprises specific additives such as heat stabilizers, in particular these stabilizers are antioxidants against thermo-oxidation and/or photo-oxidation of the polymer of the thermoplastic matrix and are organic or inorganic stabilizers.

The expression "organic stabilizer" or more generally a "combination of organic stabilizers" denotes a primary antioxidant of phenol type, a secondary antioxidant of phosphite type and even optionally other stabilizers, such as a HALS, which means Hindered Amine Light Stabilizer (for example Tinuvin® 770 from the company Ciba), an anti-UV agent (for example Tinuvin® 312 from the company Ciba), a phenolic stabilizer or a phosphorus-based stabilizer. Use may also be made of antioxidants of amine type, such as Naugard® 445 from the company Crompton, or else polyfunctional stabilizers, such as Nylostab® S-EED from the company Clariant.

The organic stabilizer present can be chosen, without this list being restrictive, from:
phenolic antioxidants, for example Irganox® 245, Irganox® 1010 or Irganox® 1098 from the company Ciba, Irganox® MD1024 from the company Ciba, Lowinox® 44B25 from the company Great Lakes, or ADK® Stab AO-80 from the company Adeka Palmarole, phosphorus-based stabilizers, such as phosphites, for example Irgafos® 168 from the company Ciba, a UV absorber, such as Tinuvin® 312 from the company Ciba, a HALS, as previously mentioned, a stabilizer of amine type, such as Naugard® 445 from the company Crompton, or else of hindered amine type, such as Tinuvin® 770 from the company Ciba, a polyfunctional stabilizer, such as Nylostab® S-EED from the company Clariant.

A mixture of two, or more, of these organic stabilizers can of course be envisioned.

The expression "inorganic stabilizer" denotes a copper-based stabilizer. By way of example of such inorganic stabilizers, mention may be made of copper halides and copper acetates. Secondarily, other metals such as silver can optionally be considered, but these metals are known to be less effective. These copper-based compounds are typically combined with halides of alkali metals, in particular potassium.

These inorganic stabilizers are more particularly used, when the structures must have improved long-term heat resistance in hot air, in particular for temperatures of greater than or equal to 100-120° C., since they tend to prevent polymer-chain cleavages.

More particularly, the term "copper-based stabilizer" is intended to mean a compound comprising at least one copper atom, in particular in ionic or ionizable form, for example in the form of a complex.

The copper-based stabilizer can be chosen from cuprous chloride, cupric chloride, cuprous bromide, cupric bromide, cuprous iodide, cupric iodide, cuprous acetate and cupric acetate. Mention may be made of halides and acetates of other metals, such as silver, in combination with the copper-based stabilizer. These copper-based compounds are typically combined with alkali metal halides. A well-known example is the mixture of CuI and KI, where the CuI:KI ratio is typically between 1:5 and 1:15. An example of such a stabilizer is Polyadd P201 from the company Ciba.

Further details on copper-based stabilizers will be found in U.S. Pat. No. 2,705,227. More recently, copper-based stabilizers such as complexed coppers, for instance Bruggolen H3336, H3337 or H3373 from the company Brüggemann, have emerged.

Advantageously, the copper-based stabilizer is chosen from copper halides, copper acetate, copper halides or copper acetate as a mixture with at least one alkali metal halide, and mixtures thereof, preferably mixtures of copper iodide and of potassium iodide (CuI/KI).

The additive can also be an impact modifier, advantageously consisting of a polymer having a flexural modulus of less than 100 MPa, measured according to the standard ISO 178 and with a Tg of less than 0° C. (measured according to the standard 11357-2:2013 at the inflection point of the DSC thermogram), in particular a polyolefin, optionally coupled with a Peba, having a flexural modulus <200 MPa.

The polyolefin of the impact modifier can be functionalized or non-functionalized or can be a mixture of at least one functionalized and/or of at least one non-functionalized.

The additives can also be fillers which can in particular be any filler known to those skilled in the art in the field of thermoplastic materials. They may in particular be heat-conducting and/or electrically conductive fillers, such as metal powder, pulverulent carbon black, carbon fibrils, carbon nanotubes (CNTs), silicon carbide, boron carbonitride, boron nitride or silicone nitride. In this respect, reference may be made to application WO 2010/130930 by the applicant.

The reinforcing fibers, whether they are long, short or continuous, are excluded from the additives and in particular the term "inorganic filler" excludes the long, short or continuous reinforcing fibers.

The additives may also be flame retardants, such as a metal salt chosen from a metal salt of phosphinic acid, a metal salt of diphosphinic acid, a polymer containing at least one metal salt of phosphinic acid, and a polymer containing at least one metal salt of diphosphinic acid.

Advantageously, the additive is chosen from an antioxidant, a heat stabilizer, a UV absorber, a light stabilizer, an impact modifier, a lubricant, an inorganic filler, a flame retardant agent, a nucleating agent and a dye.

The expression "other polymers" denotes any thermoplastic polymer and in particular a polyamide polymer, in particular an aliphatic, cycloaliphatic or aromatic polyamide, which may be microcrystalline or amorphous.

The expression "non-reactive composition" means that the composition is based on polyamide polymer in which the molecular weight is not capable of changing during its processing and which therefore corresponds to the final polyamide polymer of the thermoplastic matrix.

These polyamides according to composition b) are non-reactive, either because of the low content of reactive (residual) functions present, in particular with a content of said functions <120 meq/kg, or because of the presence of end functions of the same type at the chain end which are therefore nonreactive with one another, or because of the modification and blocking of said reactive functions by a monofunctional reactive component, for example, for the amine functions, by a modification reaction with a monoacid or a monoisocyanate and, for carboxyl functions, by reaction with a monoamine.

Advantageously, the number-average molecular weight (Mn) of said final polyamide polymer of the thermoplastic matrix of said material is preferably in a range of from 8000 to 40 000 g/mol, preferably from 10 000 to 30 000 g/mol, as determined by calculation on the basis of the content of end functions, determined by potentiometric titration in solution and the functionality of said prepolymers or by NMR. These Mn values can correspond to inherent viscosities greater than or equal to 0.8, as determined according to the standard ISO 307:2007, but changing the solvent (use of m-cresol in place of sulfuric acid and the temperature being 20° C.).

Conversely, the expression "reactive composition" means that the molecular weight of said reactive composition will change during processing by reaction of reactive prepolymers with one another by condensation, or with a chain extender by polyaddition and without elimination of volatile by-products, so as to give the final polyamide polymer of the thermoplastic matrix.

1,3-BAC (or 1,3-bis(aminomethyl)cyclohexane, CAS No. 2579-20-6) is a cycloaliphatic diamine monomer obtained in particular by hydrogenation of meta-xylenediamine (MXDA). 1,3-BAC exists in the form of two isomers, cis and trans, CAS No. 2579-20-6 corresponding to a mixture of isomers.

1,4-BAC (or 1,4-bis(aminomethyl)cyclohexane, CAS No. 2549-07-9) is a cycloaliphatic diamine monomer obtained in particular by hydrogenation of para-xylenediamine (PXDA). 1,4-BAC exists in the form of two isomers, cis and trans, CAS No. 2549-07-9 corresponding to a mixture of isomers.

Advantageously, the 1,3-BAC or the 1,4-BAC used in the BACT unit is a mixture of cis and trans isomers in a respective proportion of from 0/100 to 100/0, in particular from 75/25 to 25/75.

Advantageously, the proportion of cis-isomer in the 1,3-BAC is greater than 60%, preferentially greater than 70%, in particular greater than 80%, in particular greater than 90%.

Advantageously, the proportion of trans-isomer in the 1,4-BAC is greater than 60%, preferentially greater than 70%, in particular greater than 80%, in particular greater than 90%.

BAC and/or X can be replaced, independently of one another, up to 30 mol %, by other diamines defined above, in particular by a linear or branched aliphatic diamine, a cycloaliphatic diamine or an arylaromatic diamine such as meta-xylenediamine (MXDA).

By way of example, the linear or branched aliphatic diamine is chosen from 1,4-butanediamine, 1,5-pentanediamine, 2-methyl-1,5-pentanediamine (MPMD), 1,6 hexanediamine, 1,8-octanediamine (OMDA), 1,9-nonanediamine (NMDA), 2-methyl-1,8-octanediamine (MODA), 2,2,4-trimethylhexamethylenediamine (TMHMD), 2,4,4-trimethylhexamethylenediamine (TMHMD), 5-methyl-1,9-nonanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine and 1,18-octadecanediamine.

The cycloaliphatic diamine can be chosen from isophoronediamine, norbornanedimethylamine, 4,4'-diaminodicyclohexylmethane (PACM), 2,2-(4,4'-diaminodicyclohexyl)propane (PACP), and 3,3'-dimethyl-4,4'-diaminodicyclohexylethane (MACM).

T can be replaced, up to 30 mol %, by other dicarboxylic acids defined above, in particular by other aromatic, aliphatic or cycloaliphatic dicarboxylic acids.

The aromatic dicarboxylic acids can be chosen from naphthalenedicarboxylic acid (NDA) and isophthalic acid (IPS).

The aliphatic dicarboxylic acids can be chosen from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimerized fatty acids.

The cycloaliphatic dicarboxylic acids can be chosen from cis- and/or trans-cyclohexane-1,4-dicarboxylic acid and/or cis- and/or trans-cyclohexane-1,3-dicarboxylic acid (CHDA).

BAC and/or X and/or T can be replaced, independently of one another, up to 30 mol %, by lactams or aminocarboxylic acids.

The lactams and aminocarboxylic acids can be chosen from caprolactam (CL), α,ω-aminocaproic acid, α,ω-aminononanoic acid, α,ω-aminoundecanoic acid (AUA), lauryllactam (LL) and α,ω-aminododecanoic acid (ADA).

A maximum of 30 mol %, relative to the total sum of the BAC, X and T monomers, of replacement, whether it is with another diamine, another diacid, a lactam or an aminocarboxylic acid, or any mixture thereof, is possible.

Advantageously, a maximum of 20 mol %, relative to the total sum of the BAC, X and T monomers, of replacement, whether it is with another diamine, another diacid, a lactam or an aminocarboxylic acid, or any mixture thereof, is possible.

Advantageously, a maximum of 10 mol %, relative to the total sum of the BAC, X and T monomers, of replacement, whether it is with another diamine, another diacid, a lactam or an aminocarboxylic acid, or any mixture thereof, is possible.

In one advantageous embodiment, the present invention relates to one of the compositions for thermoplastic material Nos. 1 to 12 defined below, said composition comprising a semi-crystalline polyamide polymer and optionally short reinforcing fibers, said semi-crystalline polyamide polymer comprising a BACT/XT copolyamide in the proportions defined in table I below:

TABLE I

| Composition No. | Semi-crystalline polyamide polymer % by weight | Short reinforcing fibers % by weight | BACT mol % | XT mol % |
|---|---|---|---|---|
| 1 | 30-100 | 0-70 | 20-70 | 30-80 |
| 2 | 30-100 | 0-70 | 25-60 | 40-75 |
| 3 | 30-100 | 0-70 | 35-55 | 45-65 |
| 4 | 40-80 | 0-70 | 20-70 | 30-80 |
| 5 | 40-80 | 0-70 | 25-60 | 40-75 |
| 6 | 40-80 | 0-70 | 35-55 | 45-65 |
| 7 | 30-100 | 20-60 | 20-70 | 30-80 |
| 8 | 30-100 | 20-60 | 25-60 | 40-75 |
| 9 | 30-100 | 20-60 | 35-55 | 45-65 |
| 10 | 40-80 | 20-60 | 20-70 | 30-80 |
| 11 | 40-80 | 20-60 | 25-60 | 40-75 |
| 12 | 40-80 | 20-60 | 35-55 | 45-65 |

Advantageously, compositions 1 to 12 comprise from 0% to 50% by weight of additives and/or of other polymers.

Advantageously, said compositions consist of a semi-crystalline polyamide polymer, optionally of short reinforcing fibers, and of 0% to 50% by weight of additives and/or of other polymers, said semi-crystalline polyamide polymer comprising a BACT/XT copolyamide in the proportions defined in table I.

Advantageously, said compositions consist of a semi-crystalline polyamide polymer, optionally of short reinforcing fibers, and of 0% to 50% by weight of additives and/or of other polymers, said semi-crystalline polyamide polymer consisting of a BACT/XT copolyamide in the proportions defined in table I.

Advantageously, the proportion of additives and/or of other polymers in the compositions defined above is in addition from 0% to 50% by weight.

Advantageously, in the compositions defined above, X is a $C_9$, $C_{10}$, $C_{11}$ and $C_{12}$, in particular $C_{10}$, $C_{11}$ and $C_{12}$, diamine.

The inventors have therefore found, unexpectedly, that the compositions of the invention exhibit a better crystallization capacity, a better high Tg/low Mp compromise and especially a higher enthalpy (and therefore higher hot modulus) than the prior art compositions.

In one advantageous embodiment, the present invention relates to a composition as defined above, in which said semi-crystalline polyamide polymer has a melting point Mp<290° C., preferably <285° C., more preferentially <280° C., as determined according to the standard ISO 11357-3 (2013).

In one advantageous embodiment, the present invention relates to a composition as defined above, in which said semi-crystalline polyamide polymer has a glass transition temperature Tg>120° C., preferably >130° C., more preferentially >140° C., determined according to the standard ISO 11357-2:2013.

Advantageously, the Tg is between 125 and 165° C.

In one advantageous embodiment, the present invention relates to a composition as defined above, in which said semi-crystalline polyamide polymer exhibits a difference between the melting point and the crystallization temperature Mp–Tc<40° C., preferably <30° C., determined according to the standard ISO 11357-3:2013.

In one advantageous embodiment, the present invention relates to a composition as defined above, characterized in that the heat of crystallization of the semi-crystalline polyamide polymer, measured by differential scanning calorimetry (DSC) according to the standard ISO 11357-3:2013, is greater than 40 J/g, preferably greater than 45 J/g, and even more preferentially 50 J/g.

In one advantageous embodiment, the present invention relates to a composition as defined above, characterized in that said semi-crystalline polyamide polymer has a melting point: Mp<290° C. and a Tg>120° C.

In one advantageous embodiment, the present invention relates to a composition as defined above, characterized in that said semi-crystalline polyamide polymer has a melting point: Mp<290° C. and a Tg>130° C.

In one advantageous embodiment, the present invention relates to a composition as defined above, characterized in that said semi-crystalline polyamide polymer has a melting point: Mp<290° C. and a Tg>140° C.

In one advantageous embodiment, the present invention relates to a composition as defined above, characterized in that said semi-crystalline polyamide polymer has a melting point: Mp<285° C. and a Tg>120° C.

In one advantageous embodiment, the present invention relates to a composition as defined above, characterized in that said semi-crystalline polyamide polymer has a melting point: Mp<285° C. and a Tg>130° C.

In one advantageous embodiment, the present invention relates to a composition as defined above, characterized in that said semi-crystalline polyamide polymer has a melting point: Mp<285° C. and a Tg>140° C.

In one advantageous embodiment, the present invention relates to a composition as defined above, characterized in that said semi-crystalline polyamide polymer has a melting point: Mp<280° C. and a Tg>120° C.

In one advantageous embodiment, the present invention relates to a composition as defined above, characterized in that said semi-crystalline polyamide polymer has a melting point: Mp<280° C. and a Tg>130° C.

In one advantageous embodiment, the present invention relates to a composition as defined above, characterized in that said semi-crystalline polyamide polymer has a melting point: Mp<280° C. and a Tg>140° C.

In one advantageous embodiment, the present invention relates to a composition as defined above, characterized in that said semi-crystalline polyamide polymer has the following characteristics (table II):

TABLE II

| Compostion No. | Initial compositions | Mp (° C.) | Tg (° C.) | Mp-Tc (° C.) | Delta Hc (J/g) |
|---|---|---|---|---|---|
| 13 | Compositions 1 to 12 | <290 | >120° C. | | |
| 14 | Compositions 1 to 12 | <290 | >130° C. | | |
| 15 | Compositions 1 to 12 | <290 | >140° C. | | |
| 16 | Compositions 1 to 12 | <285 | >120° C. | | |
| 17 | Compositions 1 to 12 | <285 | >130° C. | | |
| 18 | Compositions 1 to 12 | <285 | >140° C. | | |
| 19 | Compositions 1 to 12 | <280 | >120° C. | | |
| 20 | Compositions 1 to 12 | <280 | >130° C. | | |
| 21 | Compositions 1 to 12 | <280 | >140° C. | | |
| 22 | Compositions 1 to 12 | <290 | >120° C. | <40 | |
| 23 | Compositions 1 to 12 | <290 | >130° C. | <40 | |
| 24 | Compositions 1 to 12 | <290 | >140° C. | <40 | |
| 25 | Compositions 1 to 12 | <285 | >120° C. | <40 | |
| 26 | Compositions 1 to 12 | <285 | >130° C. | <40 | |
| 27 | Compositions 1 to 12 | <285 | >140° C. | <40 | |
| 28 | Compositions 1to 12 | <280 | >120° C. | <40 | |
| 29 | Compositions 1 to 12 | <280 | >130° C. | <40 | |
| 30 | Compositions 1 to 12 | <280 | >140° C. | <40 | |
| 31 | Compositions 1 to 12 | <290 | >120° C. | <30 | |
| 32 | Compositions 1 to 12 | <290 | >130° C. | <30 | |
| 33 | Compositions 1 to 12 | <290 | >140° C. | <30 | |
| 34 | Compositions 1 to 12 | <285 | >120° C. | <30 | |
| 35 | Compositions 1 to 12 | <285 | >130° C. | <30 | |
| 36 | Compositions 1 to 12 | <285 | >140° C. | <30 | |
| 37 | Compositions 1 to 12 | <280 | >120° C. | <30 | |
| 38 | Compositions 1 to 12 | <280 | >130° C. | <30 | |
| 39 | Compositions 1 to 12 | <280 | >140° C. | <30 | |
| 40 | Compositions 1 to 12 | <290 | >120° C. | <40 | >40 |
| 41 | Compositions 1 to 12 | <290 | >130° C. | <40 | >40 |
| 42 | Compositions 1 to 12 | <290 | >140° C. | <40 | >40 |
| 43 | Compositions 1 to 12 | <285 | >120° C. | <40 | >40 |
| 44 | Compositions 1 to 12 | <285 | >130° C. | <40 | >40 |
| 45 | Compositions 1 to 12 | <285 | >140° C. | <40 | >40 |
| 46 | Compositions 1 to 12 | <280 | >120° C. | <40 | >40 |
| 47 | Compositions 1 to 12 | <280 | >130° C. | <40 | >40 |
| 48 | Compositions 1 to 12 | <280 | >140° C. | <40 | >40 |
| 49 | Compositions 1 to 12 | <290 | >120° C. | <30 | >40 |
| 50 | Compositions 1 to 12 | <290 | >130° C. | <30 | >40 |
| 51 | Compositions 1 to 12 | <290 | >140° C. | <30 | >40 |
| 52 | Compositions 1 to 12 | <285 | >120° C. | <30 | >40 |
| 53 | Compositions 1 to 12 | <285 | >130° C. | <30 | >40 |
| 54 | Compositions 1 to 12 | <285 | >140° C. | <30 | >40 |
| 55 | Compositions 1 to 12 | <280 | >120° C. | <30 | >40 |
| 56 | Compositions 1 to 12 | <280 | >130° C. | <30 | >40 |
| 57 | Compositions 1 to 12 | <280 | >140° C. | <30 | >40 |
| 58 | Compositions 1 to 12 | <290 | >120° C. | <40 | >45 |
| 59 | Compositions 1 to 12 | <290 | >130° C. | <40 | >45 |
| 60 | Compositions 1 to 12 | <290 | >140° C. | <40 | >45 |
| 61 | Compositions 1 to 12 | <285 | >120° C. | <40 | >45 |
| 62 | Compositions 1 to 12 | <285 | >130° C. | <40 | >45 |
| 63 | Compositions 1 to 12 | <285 | >140° C. | <40 | >45 |
| 64 | Compositions 1 to 12 | <280 | >120° C. | <40 | >45 |
| 65 | Compositions 1 to 12 | <280 | >130° C. | <40 | >45 |
| 66 | Compositions 1 to 12 | <280 | >140° C. | <40 | >45 |
| 67 | Compositions 1 to 12 | <290 | >120° C. | <30 | >45 |
| 68 | Compositions 1 to 12 | <290 | >130° C. | <30 | >45 |
| 69 | Compositions 1 to 12 | <290 | >140° C. | <30 | >45 |
| 70 | Compositions 1 to 12 | <285 | >120° C. | <30 | >45 |
| 71 | Compositions 1 to 12 | <285 | >130° C. | <30 | >45 |
| 72 | Compositions 1 to 12 | <285 | >140° C. | <30 | >45 |
| 73 | Compositions 1 to 12 | <280 | >120° C. | <30 | >45 |
| 74 | Compositions 1 to 12 | <280 | >130° C. | <30 | >45 |
| 75 | Compositions 1 to 12 | <280 | >140° C. | <30 | >45 |
| 76 | Compositions 1 to 12 | <290 | >120° C. | <40 | >50 |
| 77 | Compositions 1 to 12 | <290 | >130° C. | <40 | >50 |
| 78 | Compositions 1 to 12 | <290 | >140° C. | <40 | >50 |
| 79 | Compositions 1 to 12 | <285 | >120° C. | <40 | >50 |
| 80 | Compositions 1 to 12 | <285 | >130° C. | <40 | >50 |
| 81 | Compositions 1 to 12 | <285 | >140° C. | <40 | >50 |
| 82 | Compositions 1 to 12 | <280 | >120° C. | <40 | >50 |
| 83 | Compositions 1 to 12 | <280 | >130° C. | <40 | >50 |
| 84 | Compositions 1 to 12 | <280 | >140° C. | <40 | >50 |
| 85 | Compositions 1 to 12 | <290 | >120° C. | <30 | >50 |

TABLE II-continued

| Compostion No. | Initial compositions | Mp (° C.) | Tg (° C.) | Mp-Tc (° C.) | Delta Hc (J/g) |
|---|---|---|---|---|---|
| 86 | Compositions 1 to 12 | <290 | >130° C. | <30 | >50 |
| 87 | Compositions 1 to 12 | <290 | >140° C. | <30 | >50 |
| 88 | Compositions 1 to 12 | <285 | >120° C. | <30 | >50 |
| 89 | Compositions 1 to 12 | <285 | >130° C. | <30 | >50 |
| 90 | Compositions 1 to 12 | <285 | >140° C. | <30 | >50 |
| 91 | Compositions 1 to 12 | <280 | >120° C. | <30 | >50 |
| 92 | Compositions 1 to 12 | <280 | >130° C. | <30 | >50 |
| 93 | Compositions 1 to 12 | <280 | >140° C. | <30 | >50 |

In one advantageous embodiment, the present invention relates to a composition as defined above, characterized in that the BAC is 1,3-BAC.

Advantageously, the 1,3-BAC is a mixture of cis and trans isomers in a respective proportion of from 0/100 to 100/0, in particular from 75/25 to 25/75.

Advantageously, the proportion of cis-isomer in the 1,3-BAC is greater than 60%, preferentially greater than 70%, in particular greater than 80%, in particular greater than 90%.

In one advantageous embodiment, the present invention relates to a composition as defined above, in which the BAC is 1,3-BAC, and XT is chosen from 9T, 10T, 11T and 12T, more preferentially 10T, 11T and 12T.

Advantageously, XT is 10T, 10 corresponding to 1,10-decanediamine.

In one advantageous embodiment, the present invention relates to a composition as defined above, in which the sum of the monomers which replace the terephthalic acid, the BAC and X is equal to 0. In the latter embodiment, there is consequently no longer any possible replacement of the monomers in compositions 1 to 93 as defined above.

In one advantageous embodiment, the present invention relates to a composition as defined above, characterized in that said semi-crystalline polyamide polymer is a non-reactive composition according to b).

This means that said composition is the same as that of the matrix (polyamide) polymer of said thermoplastic material, since there is an absence of reaction in this composition, which remains stable and unchanging in terms of molecular weight when it is heated for the processing of the thermoplastic material of the invention. The characteristics of the polyamide polymer in this composition are the same, with Mp, Tg, Mp–Tc and Delta Hc as already defined above, as those of the final polymer.

The polyamides according to b) are obtained by a conventional polycondensation reaction from the monomer components which are diamines, diacids and optionally amino acids or lactams, in particular in the context of replacement of the monomers.

In one advantageous embodiment, the present invention relates to a composition as defined above, characterized in that said polyamide composition is a reactive composition of prepolymer according to a) and precursor of said polyamide polymer of said matrix of the thermoplastic material.

According to the reactive composition a), it is possible to distinguish three possibilities given in detail below:

Advantageously, said composition a) comprises or consists of at least one reactive prepolymer carrying, on the same chain, two end functions X' and Y' which are respectively coreactive with one another by condensation, with X' and Y' being amine and carboxyl or carboxyl and amine respectively.

The prepolymer is a reactive polyamide bearing, on the same chain (that is to say on the same prepolymer), two end functions X' and Y', which functions are respectively coreactive with one another by condensation.

This condensation (or polycondensation) reaction can bring about the elimination of byproducts. The latter can be eliminated by preferably working according to a process using an open-mold technology. In the case of a closed-mold process, a step of degassing, preferably under vacuum, the by-products eliminated by the reaction is present, in order to prevent the formation of microbubbles of the by-products in the final thermoplastic material, which (microbubbles) can affect the mechanical performance levels of said material if they are not eliminated in this way.

After condensation, the characteristics of the final polyamide polymer obtained, in this composition, are the same, with Mp, Tg, Mp–Tc and Delta Hc as already defined above.

Advantageously, said reactive composition a) comprises at least two polyamide prepolymers which are reactive with one another and which each respectively carry two identical end functions X' or Y', said function X' of a prepolymer being able to react only with said function Y' of the other prepolymer, in particular by condensation, more particularly with X' and Y' being amine and carboxyl or carboxyl and amine respectively.

In the same way, this condensation (or polycondensation) reaction can bring about the elimination of by-products which can be eliminated as defined above.

After condensation, the characteristics of the final polyamide polymer obtained, in this composition, are the same, with Mp, Tg, Mp–Tc and Delta Hc as already defined above.

Advantageously, said composition a) or precursor composition comprises or consists of:

a1) at least one prepolymer of said thermoplastic polyamide polymer, carrying n end reactive functions X', chosen from: —NH$_2$, —CO$_2$H and —OH, preferably NH$_2$ and —CO$_2$H, with n being from 1 to 3, preferably from 1 to 2, more preferably 1 or 2, more particularly 2, a2) at least one chain extender Y-A'-Y, with A' being a hydrocarbon biradical of nonpolymeric structure, carrying 2 identical end reactive functions Y, which are reactive by polyaddition with at least one function X' of said prepolymer a1), preferably with a molecular weight of less than 500 and more preferably of less than 400.

Mention may be made, as suitable examples of extenders a2) as a function of the functions X' carried by said semi-crystalline polyamide prepolymer a1), of the following:

when X' is NH$_2$ or OH, preferably NH$_2$:
either the chain extender Y-A'-Y corresponds to
Y chosen from the groups: maleimide, optionally blocked isocyanate, oxazinone, oxazolinone et epoxy,
and
A' is a hydrocarbon-based spacer optionally comprising one or more heteroatoms, and linking the functions Y with one another, in particular A' is a hydrocarbon-based spacer or a carbon-based radical bearing the reactive functions or groups Y, chosen from:
a covalent bond between two functions (groups) Y in the case where Y=oxazinone et oxazolinone or
an aliphatic hydrocarbon-based chain or an aromatic and/or cycloaliphatic hydrocarbon-based chain, the latter two comprising at least one optionally substituted ring of 5 or 6 carbon atoms, with optionally said aliphatic hydrocarbon-based chain optionally having a molecular weight of 14 to 400 g·mol$^{-1}$ or the chain extender Y-A'-Y corresponds to Y being a caprolactam group and to A' being able to be a carbonyl radical, such as carbonylbiscaprolactam, or to A' being able to be a terephthaloyl or an isophthaloyl, or said chain extender Y-A'-Y carries a cyclic anhydride group Y, and preferably this extender is chosen from a cycloaliphatic and/or aromatic carboxylic dianhydride and more preferably it is chosen from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3',4,4'-benzophenone tetracarboxylic dianhydride, 1,2,3,4-cyclobutanetetracarboxylic dianhydride, hexafluoroisopropylidene bisphthalic dianhydride, 9,9-bis(trifluoromethyl)xanthenetetracarboxylic dianhydride, 3,3',4,4'-diphenylsulfone tetracarboxylic dianhydride, bicyclo[2.2.2]oct-7-ene-2,3,5,6-tetracarboxylic dianhydride, 1,2,3,4-cyclopentanetetracarboxylic dianhydride, 3,3',4,4'-diphenyl ether tetracarboxylic dianhydride or mixtures thereof and when X' is COOH:

said chain extender Y-A'-Y corresponds to:

Y chosen from the following groups: epoxy, oxazoline, oxazine, imidazoline or aziridine, such as 1,1'-iso- or terephthaloyl bis(2-methylaziridine), A' being a carbon-based spacer (radical) as defined above.

More particularly, when, in said extender Y-A'-Y, said function Y is chosen from oxazinone, oxazolinone, oxazine, oxazoline or imidazoline, in this case, in the chain extender represented by Y-A'-Y, A' can represent an alkylene, such as —(CH$_2$)$_m$— with m ranging from 1 to 14 and preferably from 2 to 10, or A' can represent a cycloalkylene and/or an arylene which is substituted (alkyl) or unsubstituted, such as benzenic arylenes, for example o-, m- or p-phenylenes, or naphthalenic arylenes, and preferably A' is an arylene and/or a cycloalkylene.

In the case of carbonyl- or terephthaloyl- or isophthaloyl-biscaprolactam as chain extender Y-A'-Y, the preferred conditions avoid the elimination of byproduct, such as caprolactam, during said polymerization and processing in the molten state.

In the optional case mentioned above where Y represents a blocked isocyanate function, this blocking can be obtained by blocking agents for the isocyanate function, such as epsilon-caprolactam, methyl ethyl ketoxime, dimethylpyrazole or diethyl malonate.

Likewise, in the case where the extender is a dianhydride which reacts with a prepolymer P(X')n where X'=NH$_2$, the preferred conditions prevent any formation of an imide ring during the polymerization and during the processing in the molten state.

As examples of chain extenders comprising a reactive function Y=epoxy which are suitable for implementing the invention, mention may be made of optionally substituted aliphatic, cycloaliphatic or aromatic diepoxides. As examples of aliphatic diepoxides, mention may be made of aliphatic diol diglycidyl ethers, as aromatic diepoxides, mention may be made of bisphenol A diglycidyl ethers such as bisphenol A diglycidyl ether (BADGE) and, as cycloaliphatic diepoxides, mention may be made of cycloaliphatic diol or hydrogenated bisphenol A diglycidyl ethers. More generally, as examples of diepoxides that are suitable for use according to the invention, mention may be made of bisphenol A diglycidyl ether (BADGE), and its (cycloaliphatic) hydrogenated derivative, bisphenol F diglycidyl ether, tetrabromo bisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether of Mn<500, polypropylene glycol diglycidyl ether of Mn<500, polytetramethylene glycol diglycidyl ether of Mn<500, resorcinol diglycidyl ether, neopentyl glycol diglycidyl ether, bisphenol A polyethylene glycol diglycidyl ether of Mn<500, bisphenol A polypropylene glycol diglycidyl ether of Mn<500, diglycidyl esters of a dicarboxylic acid, such as terephthalic acid glycidyl ester, or epoxidized diolefins (dienes) or fatty acids with a double epoxidized ethylenic unsaturation, diglycidyl 1,2-cyclohexanedicarboxylate, and mixtures of the diepoxides mentioned.

As examples of chain extenders bearing oxazoline or oxazine reactive functions Y that are suitable for the implementation of the invention, reference may be made to those described under references "A", "B", "C" and "D" on page 7 of application EP 0 581 642, and also to the processes for preparing same and the modes of reaction thereof which are disclosed therein. "A" in this document is bisoxazoline, "B" is bisoxazine, "C" is 1,3-phenylenebisoxazoline and "D" is 1,4-phenylenebisoxazoline.

Reference may be made, as examples of chain extenders having an imidazoline reactive function Y which are suitable for the implementation of the invention, to those described ("A" to "F") on pages 7 to 8 and table 1 on page 10 in the application EP 0 739 924, and also to their processes of preparation and their modes of reaction which are disclosed therein.

Reference may be made, as examples of chain extenders having a reactive function Y=oxazinone or oxazolinone which are suitable for the implementation of the invention, to those described under references "A" to "D" on pages 7 to 8 of the application EP 0 581 641, and also to their processes of preparation and their modes of reaction which are disclosed therein.

Mention may be made, as examples of oxazinone (ring having 6 atoms) and oxazolinone (ring having 5 atoms) groups Y which are suitable, of the groups Y derived from: benzoxazinone, oxazinone or oxazolinone, with as spacer A' which can be a covalent single bond with for respective corresponding extenders being: bis(benzoxazinone), bisoxazinone and bisoxazolinone. A' can also be a C$_1$ to C$_{14}$, preferably C$_2$ to C$_{10}$, alkylene but A' is preferably an arylene and more particularly it can be a phenylene (substituted by Y in the 1,2 or 1,3 or 1,4 positions) or a naphthalene radical (disubstituted by Y) or a phthaloyl (iso- or terephthaloyl) or A' can be a cycloalkylene.

For the Y functions such as oxazine (6-membered ring), oxazoline (5-membered ring) and imidazoline (5-membered ring), the radical A' can be as described above with it being possible for A' to be a single covalent bond and with the respective corresponding extenders being: bisoxazine, bisoxazoline and bisimidazoline. A' may also be a C$_1$ to C$_{14}$, preferably C$_2$ to C$_{10}$, alkylene. The radical A' is preferably an arylene and it can more particularly be a phenylene (substituted by Y in the 1,2 or 1,3 or 1,4 positions) or a naphthalene radical (disubstituted by Y) or a phthaloyl (iso- or terephthaloyl) or A' can be a cycloalkylene.

In the case where Y=aziridine (3-membered nitrogenous heterocycle equivalent to ethylene oxide with replacement of the ether —O— by —NH—), the radical A' can be a phthaloyl (1,1'-iso- or terephthaloyl) with, as an example of an extender of this type, 1,1'-isophthaloylbis(2-methylaziridine).

The presence of a catalyst of the reaction between said prepolymer P(X')n and said extender Y-A'-Y at a content ranging from 0.001% to 2%, preferably from 0.01% to 0.5%, with respect to the total weight of the two coreactants mentioned, can accelerate the (poly)addition reaction and thus shorten the production cycle.

According to a more particular case of the choice of said extender, A' can represent an alkylene, such as —$(CH_2)_m$— with m ranging from 1 to 14 and preferably from 2 to 10, or represents an alkyl-substituted or unsubstituted arylene, such as benzenic arylenes (such as o-, m- or p-phenylenes) or naphthalenic arylenes (with arylenes: naphthalenylenes). Preferably, A' represents an arylene which may be a substituted or unsubstituted benzenic or naphthalenic arylene.

As already specified, said chain extender (a2) has a nonpolymeric structure and preferably a molecular weight of less than or equal to 500, more preferentially of less than or equal to 400.

Said reactive prepolymers of said reactive composition a), according to the three options mentioned above, have a number-average molecular weight Mn ranging from 500 to 10 000, preferably from 1000 to 6000. All the weights Mn are determined by potentiometer or by NMR (Postma et al. (Polymer, 47, 1899-1911 (2006)).

It is clearly obvious that the reaction of a polyamide prepolymer with a chain extender, even if it is capable of forming units other than amide units, results in a polymer which is very predominantly made of amide units, which therefore still corresponds to a polyamide polymer.

In the case of the reactive compositions of the invention according to definition a), said reactive prepolymers are prepared by conventional polycondensation reaction between the diamine and corresponding diacid components and optionally (according to the replacements) amino acid or lactam components. The prepolymers bearing amine and carboxyl functions X' and Y' on the same chain can be obtained, for example, by adding a combination of monomers (amino acid, diamine, diacid) having in total an equal amount of amine and carboxyl units, but by not carrying out the reaction to complete conversion. Another route for obtaining these prepolymers carrying an X' function and a Y' is, for example, by combining a prepolymer carrying 2 identical X'=amine functions with a diacid prepolymer carrying Y'=carboxyl, with an overall molar content of acid functions equal to that of the starting amine functions X'.

In order to obtain prepolymers functionalized with identical (amine or carboxyl) functions on the same chain, it is sufficient to have an excess of diamine (or of amine functions overall) in order to have amine end functions or an excess of diacid (or of carboxyl functions overall) in order to have carboxyl end functions.

In the case of a prepolymer P(X')n with n identical functions X', the functionality 1 can be obtained in the presence of a blocking monofunctional component (monoacid or monoamine, depending on the nature of X=amine or carboxyl).

A functionality n=2 can be obtained starting from bifunctional components: diamines and diacids with excess of one to attach X depending on this excess.

For n=3, for example, for a prepolymer P(X')n, the presence of a trifunctional component is necessary, for example the presence of a triamine (one mol per prepolymer chain) with a diamine in the reaction with a diacid. The preferred functionality for P(X')n is n=2.

In one advantageous embodiment, the present invention relates to a composition as defined above, said composition a) or precursor composition comprising or consisting of:
a1) at least one prepolymer of said thermoplastic polyamide polymer, carrying n end reactive functions X', and
a2) at least one chain extender Y-A'-Y,
in which X' is $NH_2$ or OH, in particular $NH_2$, and Y is chosen from an anhydride, in particular 3,3',4,4'-benzophenone tetracarboxylic dianhydride, an oxazinone, an oxazolinone and an epoxy.

In one advantageous embodiment, the present invention relates to a composition as defined above, said composition a) or precursor composition comprising or consisting of:
a1) at least one prepolymer of said thermoplastic polyamide polymer, carrying n end reactive functions X', and
a2) at least one chain extender Y-A'-Y,
in which X' is $CO_2H$ and Y is chosen from an epoxy and an oxazoline.

Advantageously, X' is $CO_2H$ and Y-A'-Y is chosen from phenylenebisoxazolines, preferably 1,3-phenylenebis(2-oxazoline) or 1,4-phenylenebis(2-oxazoline) (PBO).

In one advantageous embodiment, the present invention relates to a composition as defined above, characterized in that it comprises a1) at least one amino prepolymer (bearing —$NH_2$) of said thermoplastic polymer of the matrix, in particular with at least 50% and more particularly with 100% of the end groups of said prepolymer a1) being primary amine functions —$NH_2$, and a2) at least one nonpolymeric chain extender bearing a cyclic carboxylic anhydride group, preferably borne by an aromatic ring, having as substituent a group comprising an ethylenic or acetylenic unsaturation, preferably acetylenic unsaturation, said carboxylic anhydride group possibly being in acid, ester, amide or imide form with said extender a2) being present in a content corresponding to an a2)/(—$NH_2$) molar ratio of less than 0.36, preferably ranging from 0.1 to 0.35, more preferentially ranging from 0.15 to 0.35 and even more preferentially ranging from 0.15 to 0.31, and in that said thermoplastic polymer of the matrix is the product of the polymerization reaction by extension of said prepolymer a1) by said extender a2).

Said reaction, through the choice of the components a1) and a2) and of the specific molar ratio thereof, results in a final thermoplastic polymer which is not crosslinked.

Said prepolymer a1) bears primary amine groups represented by —$NH_2$. More particularly, it should be noted that the average number of primary amine groups per molecule of prepolymer a1), in other words the average functionality with respect to primary amine groups, can range from 1 to 3 and preferably from 1 to 2. In particular, the functionality of said prepolymer a1) of at least 50% of the end groups of said prepolymer a1) being —$NH_2$ primary amine functions, this means that it is possible for a portion to be carboxyl groups or blocked chain ends without a reactive group and, in this case, the average —$NH_2$ functionality can thus range from 1 to 3 and preferably from 1 to 2.

The term "thermoplastic" in the case of the present invention means that the polymer resulting from the reaction of the prepolymer a1) and of the extender a2) is essentially thermoplastic, which means that it contains less than 15% of its weight, preferably less than 10% of its weight and more preferentially less than 5% of its weight and even more preferentially 0% of its weight (to within 0.5% or to within 1%), of crosslinked polymers which are insoluble or infusible.

Said extender a2) can be chosen from:
ethynyl o-phthalic, methylethynyl o-phthalic, phenylethynyl o-phthalic, naphthylethynyl o-phthalic, 4-(o-phthaloylethynyl) o-phthalic or 4-(phenyl ethynyl ketone) o-phthalic, the latter also being called 4-(phenylethynyl) trimellitic, anhydrides and anhydride derivatives in acid, ester, amide or imide form,
ethynyl isophthalic, methylethynyl isophthalic, phenylethynyl isophthalic, naphthylethynyl isophthalic, 4-(o-phthaloylethynyl) isophthalic, 4-(phenyl ethynyl ketone) isophthalic, ethynyl terephthalic, methylethynyl terephthalic, phenylethynyl terephthalic, naphthylethynyl terephthalic, 4-(o-phthaloylethynyl) terephthalic, ethynyl benzoic, methylethynyl benzoic, phenylethynyl benzoic, naphthylethynyl benzoic or 4-(o-phthaloylethynyl) benzoic acids or acid esters or amides.

Advantageously, said extender a2) is chosen from aromatic anhydride compounds, preferably o-phthalic anhydride compounds, substituted, in position 4 of the aromatic ring, by a substituent defined by a group R—C≡C—(R')x- with R being a $C_1$-$C_2$ alkyl or H or aryl, in particular phenyl, or R is the residue of an aromatic carboxylic anhydride, preferably o-phthalic anhydride, bonded to the acetylenic triple bond via the carbon in position 4 of the aromatic ring and x being equal to 0 or to 1, and when x is equal to 1, R' is a carbonyl group.

Advantageously, said extender a2) is chosen from o-phthalic aromatic anhydride compounds bearing, in position 4, a substituent group chosen from methylethynyl, phenylethynyl, 4-(o-phthaloyl)ethynyl or phenyl ethynyl ketone, also called (phenylethynyl) trimellitic anhydride, and preferably bearing, in position 4, a substituent group chosen from methylethynyl and phenyl ethynyl ketone.

Advantageously, said extender a2), as defined above and regardless of its structure, has a molecular weight of less than or equal to 500, preferably less than or equal to 400.

Advantageously, the content of said extender a2), as defined above and regardless of its structure, in said polyamide polymer ranges from 1% to 20%, in particular from 5% to 20%.

In one advantageous embodiment, the present invention relates to a composition as defined above, characterized in that it is a molding composition.

According to another aspect, the present invention relates to a process for manufacturing a thermoplastic composite material, in particular a mechanical part or a structural part based on said material, having a composition as defined above, characterized in that it comprises at least one step of polymerization of at least one reactive composition a) as defined above according to the invention or a step of molding or of processing at least one nonreactive composition b) as defined above by extrusion, injection-molding or molding.

In one advantageous embodiment, the present invention relates to a process for manufacturing a thermoplastic material as defined above, characterized in that it comprises the following steps:
i) injection of a composition as defined above devoid of fibrous reinforcement in an open or closed mold or out of mold,
ii) polymerization reaction in the case of a reactive composition a) of polyamide as defined above, by heating said composition of stage i) with chain extension, as the case may be, by a polycondensation reaction or by a bulk melt polyaddition reaction, with, in the case of the polycondensation, removal under vacuum of the condensation products when a closed mold is involved, using a vacuum extraction system, otherwise and preferably with the polycondensation being carried out in an open mold or out of mold,
iii) processing or molding of said composition of stage i), in the case of a nonreactive polyamide composition b), in order to form the final part in a mold or with another processing system, and, in the case of a reactive composition a), a stage of processing by molding or by another processing system and simultaneously with polymerization stage ii).

According to another aspect, the present invention relates to a semi-crystalline polyamide polymer, characterized in that it corresponds to (or is) the polymer of the thermoplastic matrix of said thermoplastic composite material, as defined above, said polymer being a non-reactive polymer as defined according to said composition b) or a polymer that can be obtained from a reactive composition as defined according to said composition a).

This thermoplastic polymer is by definition one of the essential components of the composition of the thermoplastic material of the present invention and is therefore part of the invention as a product linked to the present invention with the same common inventive concept in the face of the same technical problem to be solved. The invention therefore also covers the use of said thermoplastic polymer according to the invention as thermoplastic matrix of a thermoplastic material based on a fibrous reinforcement as described above.

According to yet another aspect, the present invention relates to the use of a composition as defined above or of a non-reactive polymer as defined according to said composition b) or a polymer that can be obtained from a reactive composition as defined according to said composition a), for manufacturing mechanical or structural parts, based on said thermoplastic material, of a monolayer or multilayer tube, or of a film.

In one advantageous embodiment, the present invention relates to the use as defined above, characterized in that said mechanical or structural parts of said thermoplastic material concern applications in the motor vehicle, railway, marine (maritime) and wind power fields, the photovoltaic field, the solar energy field, including solar panels and components of solar power stations, the sport field, the aeronautical and aerospace field, and the road transport (regarding trucks), construction, civil engineering, panel and leisure fields.

In another advantageous embodiment, the present invention relates to the use as defined above, characterized in that said mechanical parts for applications in the motor vehicle field are parts under an engine hood for the transportation of fluid, in particular in air intake devices, cooling devices (for example using air, cooling fluid, etc.), devices for the transportation or transfer of fuels or fluids, in particular oil, water, etc.

In yet another advantageous embodiment, the present invention relates to the use as defined above, characterized in that said mechanical or structural parts for applications in the electrical or electronics field are electrical and electronic goods, such as encapsulated solenoids, pumps, telephones, computers, printers, fax machines, modems, monitors, remote controls, cameras, circuit breakers, electric cable sheaths, optical fibers, switches, multimedia systems.

According to another aspect, the present invention relates to a thermoplastic material resulting from the use of at least one composition for thermoplastic material as defined above.

According to another aspect, the present invention relates to a mechanical or structural part made from thermoplastic material, resulting from the use of at least one composition as defined above or from the use of a polyamide polymer as defined above, or that it is based on a composite material as defined above or that it is obtained by means of a process as defined above.

In one advantageous embodiment, the part defined above is a mechanical part for applications in the motor vehicle field, such as parts under an engine hood for the transportation of fluid, in particular in air intake devices, cooling devices (for example using air, cooling fluid, etc.), devices for the transportation or transfer of fuels or fluids (such as oil, water, etc.).

In one advantageous embodiment, the part as defined above is a mechanical or structural part for applications in the electrical or electronics field, such as electrical and electronic goods, such as encapsulated solenoids, pumps, telephones, computers, printers, fax machines, modems, monitors, remote controls, cameras, circuit breakers, electric cable sheaths, optical fibers, switches, multimedia systems.

Methods for Determining the Characteristics Mentioned

The measurement of the intrinsic or inherent viscosity is carried out in m-cresol. The method is well known to those skilled in the art. The standard ISO 307:2007 is followed but with the solvent being changed (use of m-cresol instead of sulfuric acid and the temperature being 20° C.).

The glass transition temperature Tg is measured using a differential scanning calorimeter (DSC), after a second heating cycle, according to the standard ISO 11357-2: 2013. The heating and cooling rate is 20° C./min.

The melting point Mp and the crystallization temperature Tc are measured by DSC, according to the standard ISO 11357-3:2013. The heating and cooling rate is 20° C./min.

The heat of crystallization of said matrix polymer is measured by differential scanning calorimetry (DSC) according to the standard ISO 11357-3:2013.

The modulus E' at 180° C. is obtained from curves of dynamic mechanical analysis (DMA) carried out on bars in tension mode, using a temperature gradient of 2° C./min, a frequency of 1 Hz and an amplitude of 10 μm.

The Mn of the prepolymer is determined by titration (assay) of the COOH or NH$_2$ end functions according to a potentiometric method and from a theoretical functionality of 2.

DESCRIPTION OF THE FIGURES

FIG. 1 shows the Mp, Tg, Tc and Deltac Hc curves obtained as a function of the molar percentage of BACT in a BACT/10T copolyamide.
The curves represent:
Solid circles: Mp.
Empty circles: Tc.
Squares: Tg
Diamonds: Heat of crystallization.

EXAMPLES

A—Preparation of a Polyamide Polymer by the Direct Route (without Chain Extension)

The following procedure is an example of a preparation process, and is not limiting. It is representative of all the compositions according to the invention:

5 kg of the following starting materials are introduced into a 14-liter autoclave reactor:
500 g of water,
the diamines,
the amino acid (optionally),
the terephthalic acid and optionally one or more other diacid(s),
the monofunctional chain regulator: benzoic acid, in an amount suitable for the targeted Mn and varying (benzoic acid) from 50 to 100 g,
35 g of sodium hypophosphite in solution,
0.1 g of a Wacker AK1000 antifoaming agent (Wacker Silicones).

The natures and molar ratios of the molecular structures and units of the polyamides (by referenced test) are given in table III below.

The closed reactor is purged of its residual oxygen and then heated to a temperature of 230° C. with respect to the material introduced. After stirring for 30 minutes under these conditions, the pressurized vapor which has formed in the reactor is gradually reduced in pressure over 60 minutes, while gradually increasing the internal temperature so that it becomes established at Mp+10° C. at atmospheric pressure.

The polymerization is then continued under nitrogen flushing of 20 l/h until the targeted weight Mn shown in the characteristics table is obtained.

The polymer is subsequently emptied out via the bottom valve, then cooled in a water trough and then granulated.

The results are given in the following tables III-VI. They were obtained using 1,3-BAC having a cis/trans ratio of 75/25 mol %.

TABLE III

| Ref | 10T mol % | BACT mol % | Mp ° C. | Tc ° C. | Mp − Tc ° C. | DeltaHc J/g | Tg ° C. | Inherent viscosity — | E' 180° C. MPa |
|---|---|---|---|---|---|---|---|---|---|
| C 10T* | 100.0 | 0.0 | 314 | 279 | 35 | 63 | 120 | insoluble | — |
| I1 | 60.0 | 40.0 | 275.6 | 241.7 | 33.9 | 60.8 | 134.0 | 0.92 | — |
| I2 | 50.0 | 50.0 | 281.7 | 248.3 | 33.4 | 53.5 | 153.4 | 1.05 | 805.3 |
| I3 | 50.0 | 50.0 | 279.4 | 242.5 | 36.9 | 55.5 | 146.0 | 0.93 | — |
| I4 | 45.0 | 55.0 | 279.8 | 252.0 | 27.8 | 62.2 | 142.7 | 0.87 | — |
| I5 | 45.0 | 55.0 | 282.0 | 253.5 | 28.5 | 49.7 | 160.2 | 1.09 | — |
| I6 | 40.0 | 60.0 | 286.1 | 250.4 | 35.7 | 57.0 | 163.9 | 0.94 | 886 |
| I7 | 30.0 | 70.0 | 289.7 | 258.6 | 31.1 | 40.6 | 165.6 | 0.86 | — |
| C BACT* | 0.0 | 100.0 | 349 | — | — | — | 187 | — | — |

C denotes Comparative
I denotes Invention
*According to JP2015017177

The results of table 3 show that, for a BACT molar fraction of 20 (not indicated in the table) to 70 mol % (preferably 25 to 60 mol %), the melting point is below 290° C. (preferably below 280° C.).

At the same time, the Tg is very high and can be modulated from 125° C. (not indicated in the table) to approximately 165° C. The heat of crystallization for all these products is particularly high, and in particular greater than 50 J/g (in particular greater than the MXDT/10T described in WO 2014/064375).

TABLE IV

| Ref | 10T mol % | BACT mol % | 11 mol % | Mp ° C. | Tc ° C. | Mp − Tc ° C. | DeltaHc J/g | Tg ° C. | Inherent viscosity |
|---|---|---|---|---|---|---|---|---|---|
| I8 | 41.5 | 50.8 | 7.7 | 269.2 | 232.4 | 36.8 | 41.4 | 149.5 | 1.14 |
| I9 | 38.2 | 46.9 | 14.9 | 256.1 | 189.7 | 66.4 | 28.7 | 144.9 | 1.22 |

The partial replacement of one of the two units with 11-aminoundecanoic acid is also possible and gives good results for obtaining a good Mp/Tg compromise (table IV).

TABLE V

| Ref | 10T mol % | BACT mol % | 6T mol % | Mp ° C. | Tc ° C. | Mp − Tc ° C. | DeltaHc J/g | Tg ° C. | Inherent viscosity |
|---|---|---|---|---|---|---|---|---|---|
| I10 | 42.5 | 51.9 | 5.5 | 270.9 | 234.0 | 36.9 | 49.7 | 161.3 | 1.02 |
| I11 | 40.5 | 49.5 | 10 | 263.9 | 233.2 | 30.7 | 44.5 | 143.2 | 0.86 |

The partial replacement of one of the two units with the 6T unit is also possible and gives good results for obtaining a good Mp/Tg compromise (table V).

TABLE VI

| Ref. | Test type | Molecular structure/ Molar composition | Mp ° C. | Tc ° C. | Mp − Tc ° C. | DeltaHc J/g | Tg ° C. | Inherent viscosity |
|---|---|---|---|---|---|---|---|---|
| C1 | Comparative (EP1988113) | 10T/6T (59/41) | 281 | 236 | 45 | 44 | 122 | 1.12 |
| C2 | Comparative (EP1988113) | 10T/6T/11 (60/24/16) | 269 | 220 | 39 | 39 | 111 | 1.25 |
| C3 | Comparative (WO2011/00393) | 10T/TMDT (59/41) | 263 | 197 | 36 | 35 | 133 | 1.15 |
| C10T | Comparative | 10T (100) | 314 | 279 | 35 | 63 | 120 | insoluble |
| C4 | Comparative | 10T/11 (67/33) | 269 | 232 | 37 | 50 | 84 | 1.19 |
| C5 | Comparative | 10,T/11 (59/41) | 261 | 213 | 48 | 39 | 78 | 1.15 |
| C6 | Comparative | 10T/10I (67/33) | 269 | 205 | 64 | 32 | 110 | 1.12 |
| C7 | Comparative | MXDT/11 (59/41) | 211 | (*) | >100 | 12 | 111 | 1.25 |
| C8 | Comparative | MPMDT/11 (59/41) | — | (*) | — | — | 84 | 1.14 |
| C9 | Comparative | 10T/MXDT (50/50) | 262 | 211 | 51 | 17 | 137 | 0.99 |
| C10 | Comparative | 10T/MPMDT (59/41) | 264 | 219 | 45 | 40 | 126 | 1.11 |
| C11 | Comparative | 10T/MPMDT (50/50) | 245 | 185 | 60 | 22 | 127 | 1.12 |
| C12 | Comparative | 10T/12T/11 (60/24/16) | 271 | 246 | 25 | 56 | 105 | 0.98 |
| C13 | Comparative | 18T/MXDT (71/29) | 264 | 242 | 22 | 47 | 95 | 0.86 |

(*): No crystallization on cooling.

The results of table VI show that the total replacement of the Bac or of the 10T unit results in compositions which do not have the required Mp, Tg, Mp–Tc and delta Hc values.

B—Preparation of a Polyamide Polymer by Chain Extension of a Reactive Prepolymer (or Oligomer)

B-1 Preparation of Reactive Prepolymers of P(X')n (or P(Y')n) Type

The following procedure is an example of a preparation process, and is not limiting. It is representative of all the compositions according to the invention:

5 kg of the following starting materials are introduced into a 14-liter autoclave reactor:

500 g of water, the diamines, the amino acid (optionally), the terephthalic acid and optionally one or more other diacid(s), 35 g of sodium hypophosphite in solution, 0.1 g of a Wacker AK1000 antifoaming agent (Wacker Silicones).

The closed reactor is purged of its residual oxygen and then heated to a temperature of 230° C. of the material. After stirring for 30 minutes under these conditions, the pressurized vapor which has formed in the reactor is gradually reduced in pressure over 60 minutes, while gradually increasing the internal temperature so that it becomes established at Mp+10° C. at atmospheric pressure.

The oligomer (prepolymer) is subsequently emptied out via the bottom valve, then cooled in a water trough and then ground.

The natures and molar ratios of the molecular structures and units of the polyamides (by referenced test) are given in table VII below. They were obtained using 1,3-BAC having a cis/trans ratio of 75/25 mol %.

TABLE VII

| H. Ref. | Molecular structure and chemical composition (mol %) | Mp ° C. | Tc ° C. | Mp − Tc ° C. | DeltaHc J/g | Tg ° C. | Inherent viscosity | Acid number meq/kg* | Amine number meq/kg* | Mn** g/mol |
|---|---|---|---|---|---|---|---|---|---|---|
| P1 | 1,3-BACT/10T (40/60) | 259.2 | 217 | 42.2 | 45.0 | 121.0 | 0.35 | 713 | 56 | 2601 |
| P2 | 1,3-BACT/10T (40/60) | 265.7 | 230.6 | 35.1 | 58.6 | 104.6 | 0.42 | 0 | 639 | 3129 |

(*) Milliequivalents per kilogram
(**) Potentiometric Mn

B-2 Preparation of the Polyamide Polymer by Reaction Between Prepolymer P(X')n and P(Y')n A stoichiometric mixture (mol(acid)=(mol(amine)) of the two oligomers P1 (X'=COOH) and P2 (Y'=NH$_2$) above, dried and ground, is introduced with nitrogen flushing into a DSM corotating conical screw microextruder (15 ml in volume) preheated to 280° C. with screw rotation at 100 rpm. The mixture is left to recirculate in the microextruder and the increase in the viscosity is monitored by measuring the normal force. After approximately 15 minutes, the contents of the microextruder are emptied out in the form of a rod. The air-cooled product is granulated.

The product I12 obtained has an inherent viscosity equal to 1.92.

B-3 Preparation of the Polyamide Polymer by Reaction Between Prepolymer P(X')n and an Extender Y-A'-Y 10 g of the dried and ground oligomer P1 above are mixed with a stoichiometric amount of 1,3-phenylenebisoxazoline (PBO). The mixture is introduced under nitrogen flushing into a DSM corotating conical-screw microextruder (15 ml in volume) preheated to 280° C. with rotation of the screws at 100 rev/min. The mixture is left to recirculate in the microextruder and the increase in the viscosity is monitored by measuring the normal force. After approximately 2 minutes, a plateau is reached and the contents of the microextruder are emptied out in the form of a rod. The air-cooled product is granulated.

The product I13 obtained has an inherent viscosity equal to 0.97.

The invention claimed is:

1. A thermoplastic material composition, comprising:
0 to 70% by weight of short reinforcing fibers,
30% to 100% by weight of a thermoplastic matrix comprising at least one semi-crystalline polyamide polymer,
0 to 50% of additives and/or other polymers,
said thermoplastic matrix comprising at least one semi-crystalline BACT/XT copolyamide in which:
BACT is a unit comprising an amide unit present at a molar content ranging from 20% to 70%, wherein BAC is chosen from 1,3-bis(aminomethyl)cyclohexyl (1,3-BAC), 1,4-bis(aminomethyl)cyclohexyl (1,4-BAC) and a mixture thereof, and wherein T is terephthalic acid,
XT is a unit comprising an amide unit present at a molar content ranging from 30% to 80%, wherein X is a C9 to C18 linear aliphatic diamine, and wherein T is terephthalic acid,
in the BACT and/or XT units, independently of one another, up to 20 mol %, relative to the total amount of dicarboxylic acids, of the terephthalic acid can be replaced with other aromatic, aliphatic or cycloaliphatic dicarboxylic acids comprising 6 to 36 carbon atoms, and
in the BACT and/or XT units, independently of one another, up to 30 mol % of the BAC and/or where appropriate of X, relative to the total amount of diamines, can be replaced with other diamines comprising from 4 to 36 carbon atoms and
in the copolyamide, no more than 30 mol %, relative to the total amount of monomers, can be formed by lactams or aminocarboxylic acids,
and on condition that the sum of the monomers which replace the terephthalic acid, the BAC and X does not exceed a concentration of 30 mol % relative to the total amount of monomers used in the copolyamide.

2. The composition as claimed in claim 1, wherein said semi-crystalline polyamide polymer has a melting point Mp<290° C., as determined according to the standard ISO 11357-3 (2013).

3. The composition as claimed in claim 1, wherein said semi-crystalline polyamide polymer has a glass transition temperature Tg>120° C., as determined according to the standard ISO 11357-2 (2013).

4. The composition as claimed in claim 1, wherein said semi-crystalline polyamide polymer exhibits a difference between the melting point and the crystallization temperature Mp-Tc<40° C. as determined according to the standard ISO 11357-3:2013.

5. The composition as claimed in claim 1, wherein the heat of crystallization of the semi-crystalline polyamide polymer, measured by differential scanning calorimetry (DSC) according to the standard ISO 11357-3:2013, is greater than 40 J/g.

6. The composition as claimed in claim 1, wherein the BAC is 1,3-BAC.

7. The composition as claimed in claim 1, wherein the BAC is 1,3-BAC, and XT is selected from the group consisting of 9T, 10T, 11T and 12T.

8. The composition as claimed in claim 1, wherein the XT is 10T, wherein 10 corresponds to 1,10-decanediamine.

9. The composition as claimed in claim 1, wherein the sum of the monomers which replace the terephthalic acid, the BAC and X is equal to zero.

10. The composition as claimed in claim 1, further comprising at least one additive.

11. The composition as claimed in claim 10, wherein the additive is selected from the group consisting of an antioxidant, a heat stabilizer, a UV absorber, a light stabilizer, an impact modifier, a lubricant, an inorganic filler, a flame retardant agent, a nucleating agent and a dye.

12. The composition as claimed in claim 1, wherein it is a molding composition.

13. The composition as claimed in claim 1, which contains the short reinforcing fibers.

14. A method of preparing the composition as claimed in claim 1, comprising combining the short reinforcing fibers if present, thermoplastic matrix, and additives and/or other polymers if present.

15. A method of preparing mechanical or structural parts, comprising producing a mechanical or structural part from the composition as claimed in claim 1.

16. The method of claim 15, comprising molding the composition.

17. A mechanical or structural part comprising the composition as claimed in claim 1.

18. The mechanical or structural part as claimed in claim 17, wherein said part is used in a field selected from the group consisting of the motor vehicle field, electrical and electronic fields, railway field, marine and wind power fields, photovoltaic field, solar energy field, sport field, aeronautical and aerospace fields, road transport field, construction field, civil engineering field, panel field and leisure field.

19. The mechanical or structural part as claimed in claim 17, which is a part under an engine hood for the transportation of fluid, a cooling device, or a device for the transportation or transfer of fuels or fluids.

20. The mechanical or structural part as claimed in claim 17, which is an electrical or electronic good.

21. The mechanical or structural part as claimed in claim 17, which comprises a monolayer or multilayer tube or a film.

22. A composition suitable for a thermoplastic material, comprising:
0 to 70% by weight of short reinforcing fibers,
30% to 100% by weight of a thermoplastic matrix, and
0 to 50% of additives and/or other polymers,
wherein
the thermoplastic matrix comprises at least one reactive polyamide prepolymer which
produces a semi-crystalline polyamide polymer when subjected to polymerization, the reactive polyamide prepolymer comprises at least one BACT/XT copolyamide, BACT is a unit comprising an amide unit present at a molar content ranging from 20% to 70%,
wherein BAC is chosen from 1,3-bis(aminomethyl)cyclohexyl (1,3-BAC), 1,4-bis(aminomethyl)cyclohexyl (1,4-BAC) and mixtures thereof, and
T is terephthalic acid,
XT is a unit comprising an amide unit present at a molar content ranging from 30% to 80%,
wherein X is a C9 to C18 linear aliphatic diamine, and T is terephthalic acid,
in the BACT and/or XT units, independently of one another, up to 20 mol %, relative to the total amount of dicarboxylic acids, of the terephthalic acid can be replaced with other aromatic, aliphatic or cycloaliphatic dicarboxylic acids comprising 6 to 36 carbon atoms, and
in the BACT and/or XT units, independently of one another, up to 30 mol % of the BAC and/or where appropriate of X, relative to the total amount of diamines, can be replaced with other diamines comprising from 4 to 36 carbon atoms,
in the BACT/XT copolyamide, no more than 30 mol %, relative to the total amount of monomers, can be formed by lactams or aminocarboxylic acids,
the sum of the monomers which replace the terephthalic acid, the BAC and X does not exceed a concentration of 30 mol % relative to the total amount of monomers used in the BACT/XT copolyamide.

23. The composition as claimed in claim 22, wherein said semi-crystalline polyamide polymer has a melting point Mp<290° C., as determined according to the standard ISO 11357-3 (2013).

24. The composition as claimed in claim 22, wherein said semi-crystalline polyamide polymer has a glass transition temperature Tg>120° C., as determined according to the standard ISO 11357-2 (2013).

25. The composition as claimed in claim 22, wherein said semi-crystalline polyamide polymer exhibits a difference between the melting point and the crystallization temperature Mp−Tc<40° C., as determined according to the standard ISO 11357-3:2013.

26. The composition as claimed in claim 22, wherein the heat of crystallization of said semi-crystalline polyamide polymer, as measured by differential scanning calorimetry (DSC) according to the standard ISO 11357-3:2013, is greater than 40 J/g.

27. The composition as claimed in claim 22, wherein BAC is 1,3-BAC.

28. The composition as claimed in claim 22, wherein BAC is 1,3-BAC, and XT is chosen from 9T, 10T, 11T and 12T.

29. The composition as claimed in claim 22, wherein XT is 10T, and wherein 10 corresponds to 1,10-decanediamine.

30. The composition as claimed in claim 22, wherein the sum of the monomers which replace the terephthalic acid, the BAC and X is equal to zero.

31. The composition as claimed in claim 22, further comprising at least one additive.

32. The composition as claimed in claim 31, wherein the additive is chosen from an antioxidant, a heat stabilizer, a UV absorber, a light stabilizer, an impact modifier, a lubricant, an inorganic filler, a flame retardant agent, a nucleating agent and a dye.

33. The composition as claimed in claim 22, which is a molding composition.

34. The composition as claimed in claim 22, which contains the short reinforcing fibers.

35. A method of preparing the composition as claimed in claim 22, comprising combining the short reinforcing fibers if present, thermoplastic matrix, and additives and/or other polymers if present.

36. A method of preparing mechanical or structural parts, comprising producing a mechanical or structural part from the composition as claimed in claim 22.

37. The method of claim 36, comprising polymerizing the reactive polyamide prepolymer.

38. A mechanical or structural part comprising the composition as claimed in claim 22.

39. The mechanical or structural part as claimed in claim 38, which concerns an application in the motor vehicle field, electrical and electronic fields, railway field, marine and wind power fields, photovoltaic field, solar energy field, sport field, aeronautical and aerospace fields, road transport field, construction field, civil engineering field, panel field and leisure field.

40. The mechanical or structural part as claimed in claim 38, which is a part under an engine hood for the transportation of fluid, a cooling device, or a device for the transportation or transfer of fuels or fluids.

41. The mechanical or structural part as claimed in claim 38, which is an electrical or electronic good.

42. The mechanical or structural part as claimed in claim 38, which comprises a monolayer or multilayer tube or a film.

* * * * *